United States Patent
Gravis, III et al.

[15] 3,648,434
[45] Mar. 14, 1972

[54] GLYCOL REGENERATION USING EDUCTOR FLASH SEPARATION

[72] Inventors: Charles K. Gravis, III; Harold S. Wood; Robert A. Hodgson, all of Tulsa, Okla.

[73] Assignee: Maloney-Crawford Tank Corporation, Tulsa, Okla.

[22] Filed: Feb. 27, 1969

[21] Appl. No.: 802,793

[52] U.S. Cl. ....................55/32, 55/169, 55/195
[51] Int. Cl. ..........................................B01d 53/14
[58] Field of Search ..............55/32, 40, 41, 42, 44, 49, 55/55, 59, 169, 195, 171–177

[56] References Cited

UNITED STATES PATENTS

| | | | |
|---|---|---|---|
| 3,206,916 | 9/1965 | Glasgow et al. | 55/32 X |
| 3,217,466 | 11/1965 | Bogart | 55/44 |
| 3,318,071 | 5/1967 | Sinex | 55/32 |
| 3,347,019 | 10/1967 | Barnhart | 55/32 |
| 3,370,636 | 2/1968 | Francis, Jr. et al. | 55/32 |
| 3,397,731 | 8/1968 | Gravis et al. | 55/32 X |
| 3,451,897 | 6/1969 | Welch | 55/32 X |

*Primary Examiner*—Charles N. Hart
*Attorney*—Head and Johnson

[57] ABSTRACT

Reconcentration of liquid desiccant, such as glycol, used in the dehydration of gaseous steams, is accomplished by aiding the separation of water subsequent the reboiler by an induced vacuum into a separate flash chamber. The vacuum is created by a pump that is fluid impelled by either the desiccant or gas available in the process.

13 Claims, 3 Drawing Figures

GLYCOL REGENERATION USING EDUCTOR FLASH SEPARATION

BACKGROUND OF THE INVENTION

Liquid desiccants, such as glycols, are quite extensively used in the dehydration of natural gas streams. A typical separation process includes a contacting tower in which the liquid desiccant is brought into intimate contact with the natural gas stream to be dehydrated. The glycol becomes enriched by the water, is removed, and is then reconcentrated, usually by boiling off the water with heat. The reconcentrated desiccant is then recirculated either to an accumulation point or to the contacting vessel.

Because of the upper limits to which liquid desiccant can be subjected to heat, the reboiling procedure alone does not remove all of the water from the desiccant. Reboiler heat processes typically can reconcentrate the glycol to a little over 98.5 percent by weight when operated at a temperature of about 380° F. A one-tenth of one percent gain in reconcentration provides an even greater gain in dew point depression of the gas being dehydrated. Others, such as shown in U.S. Pat. No. 3,370,636, have attempted to shift the vapor equilibrium of the heat-reconcentrated desiccant by developing a vacuum using a steam jet above the surface of the reboiler. The desiccant is caused to flow from one chamber to another by the induced vacuum. Placing steam into the process merely adds additional water to the system if recycled to the reboiler, yet will waste glycol if vented. Additionally, such a system is merely an adjunct to the reboiler heat system and does not utilize available and waste energy to create the vacuum.

SUMMARY OF THE INVENTION

Accordingly, this invention provides a flash chamber separated from the desiccant reboiler, within which preheated partially reconcentrated desiccant such as glycol, is subjected to a vacuum from a fluid-impelled pump such as a jet type eductor. The eductor is driven by fluids used in the process such as rich glycol from a dehydration contactor on its way to the reboiler. Another embodiment proposes using dry gas as the eduction medium. A yet additional embodiment uses the eductor in combination with a reboiler heat generated diffusion pump to create even higher vacuum in the flash chamber than can be obtained by the eductor alone.

In the process provided by this invention the total fluid stream to be treated is first removed under vacuum conditions from the reboiler where some flashing of vapor and cooling occur. This fluid is then preheated by a reboiler heat exchanger, then subjected to the flash separation in a separate treating vessel where the vacuum is induced.

DESCRIPTION OF THE PREFERRED EMBODIMENT

Before explaining the present invention in greater detail, it is to be understood that the invention is not limited in its application to the details of construction and the arrangement in parts illustrated in the accompanying drawings, since the invention is capable of other embodiments and of being practiced or carried out in various ways. Also, it is to be understood that the phraseology or terminology employed herein is for the purpose of description and not of limitation.

Figure 1:
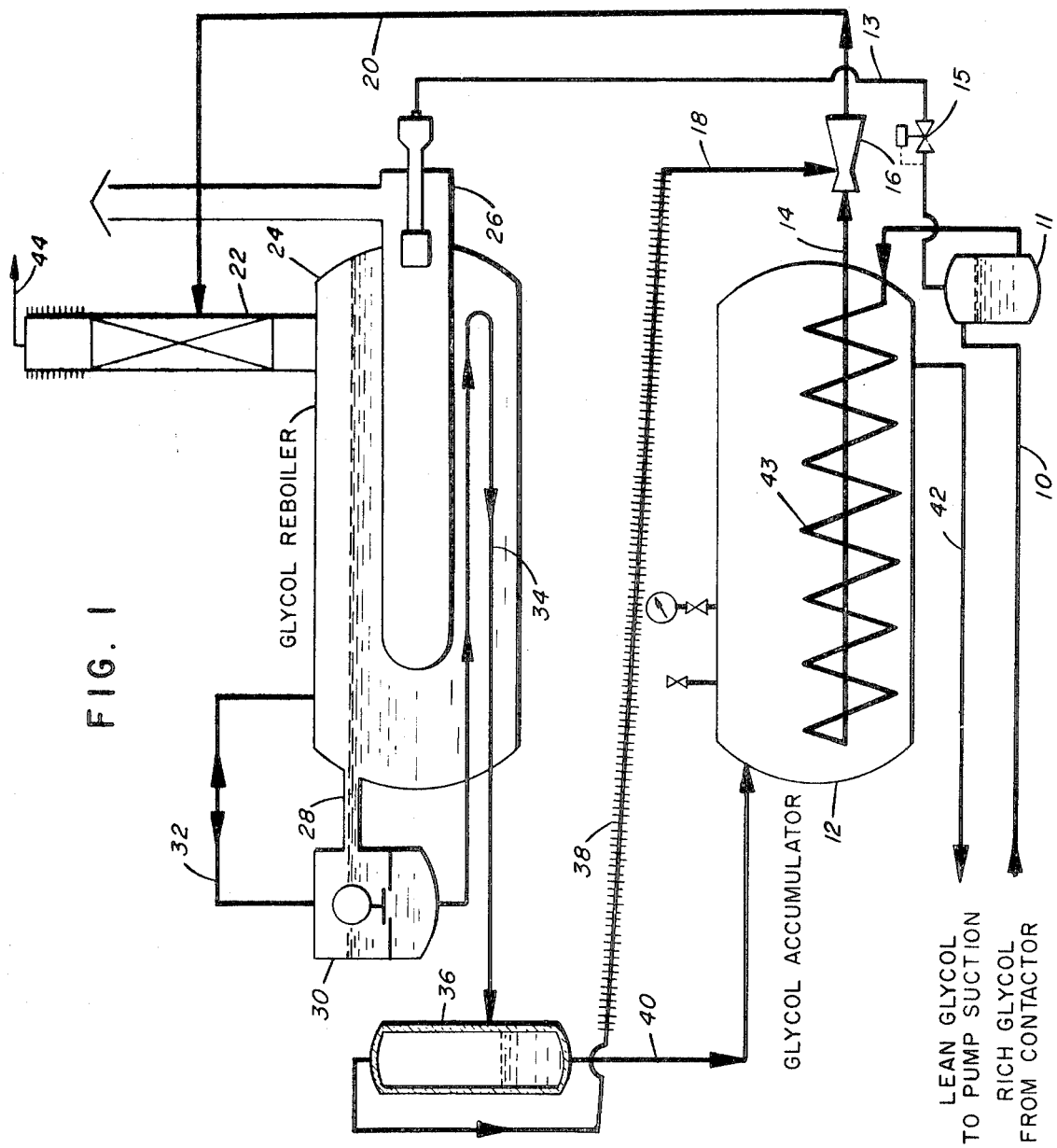
FIG. 1 is a typical embodiment of this invention wherein rich glycol is used as the educting medium for creating a vacuum within a glycol flash chamber.

Referring now to FIG. 1, glycol, rich in water received from a gas dehydration contactor tower, not shown, is caused to pass through conduit 10 to a sump tank 11. Gas separating therefrom is used as needed through pipe 13, by the reboiler burner as fuel, controlled by valve 15 or is vented. The glycol outlet of tank 11 passes to the accumulator coil 12 where the glycol is heat exchanged with reconcentrated glycol within the vessel. The outlet 14 therefrom is caused to be injected into an eductor 16 which by the jet or venturi action creates a low pressure which pumps fluids through heat exchanger conduit 18 into the eductor where both are caused to flow through conduit 20 into the stripping column 22 of glycol reboiler 24. A submerged heater tube 26 and its internal burner are mounted in the reboiler as a primary means to boil off a large percentage of the water which the glycol has absorbed from the contacting tower. Vapors therefrom are withdrawn through stripping column 22 and out through conduit 44. Partially reconcentrated glycol passes from the reboiler through a conduit 28 into a float operated trap 30 by which the level within the reboiler is maintained substantially constant. Communication is made between the trap and the upper portion of the reboiler by conduit 32 to equalize pressure. The partially reconcentrated glycol, in this embodiment, is withdrawn from trap 30 and caused to pass and return into the reboiler 24 where it is heat exchanged with the glycol therein through coil conduit 34, the outlet of which enters the vacuum flash separator chamber 36. The chamber 36, like most of the related conduit and equipment, is preferably insulated and may be packed as for example with Beryl saddles or other packing. The upper part of the chamber connects with conduit 18 on the vacuum side of the eductor after passing through a natural draft condenser 38 which further aids the vacuum creation. Flash vapor from chamber 36 passes through natural draft condenser 38 where most of the water and glycol in the vapor are condensed. The mixture of condensate and noncondensibles (including any air leakage) is exhausted through conduit 18 into the low pressure port of eductor 16. Maximum condensation of this stream is important to achieve maximum vacuum with the eductor. It is to be understood that other heat exchange means may be used as are known in the art. The higher reconcentrated glycol passes from the bottom of flash separator 36 through conduit 40 into the glycol accumulator and thence into conduit 42 to the pump suction which is supplying lean glycol to the contacting tower and the cycle is repeated.

It is well to note that as the partially reconcentrated glycol passes through valve 30 some flashing and cooling occurs. Therefore an important aspect of this invention is that before final flash separation, the total glycol stream is reheated to substantially the maximum reboiler temperature.

Figure 2:
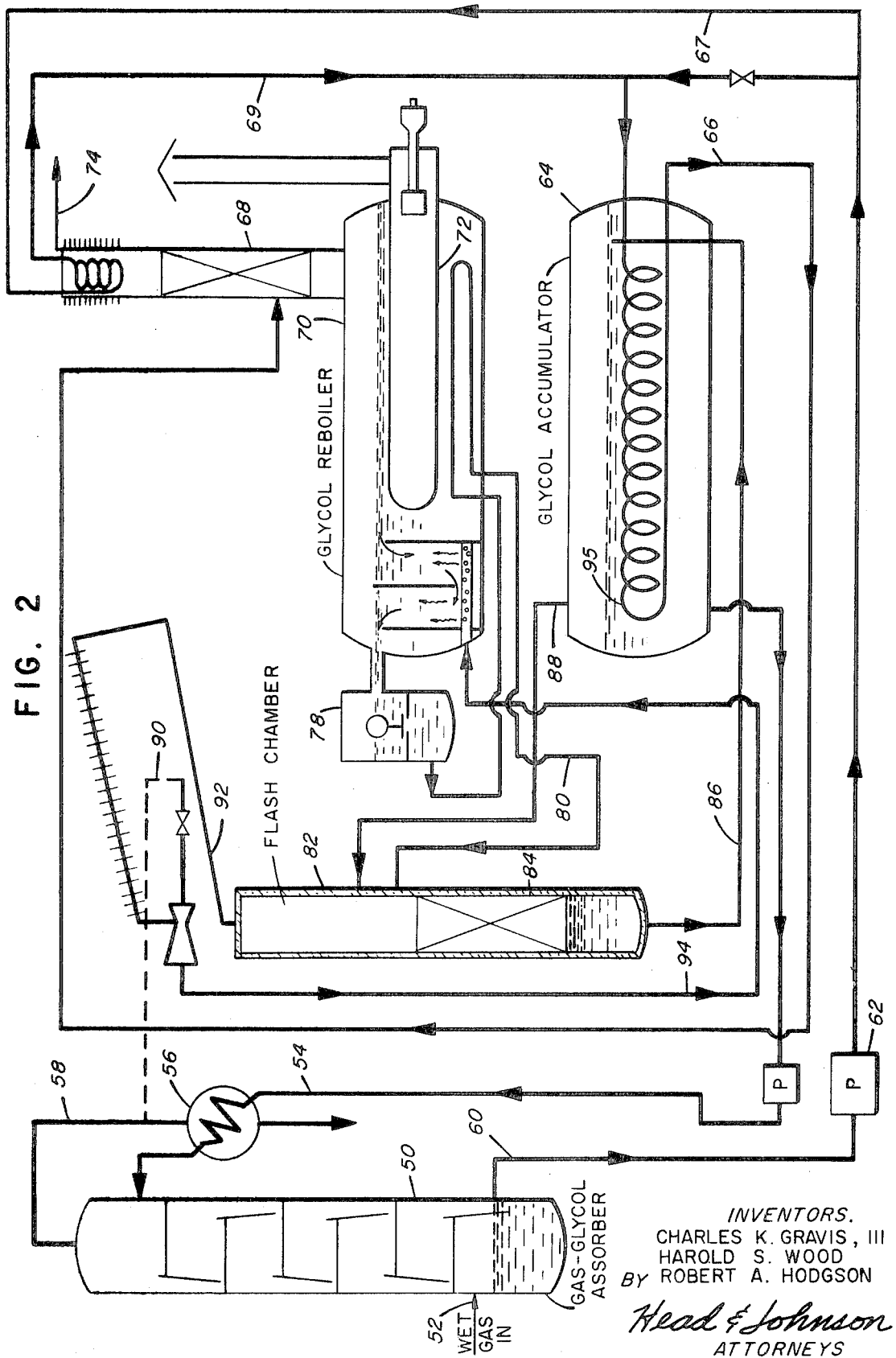
FIG. 2 is an alternate embodiment of this invention utilizing gas as the educting medium for creating a vacuum and increasing the concentration of glycol.

The embodiment of FIG. 2 shows a contacting tower 50 wherein wet gas entering through conduit 52 into the lower portion of the vessel 50 passes upwardly countercurrent to lean glycol which is entering through conduit 54 after being heat exchanged at 56 with the dry gas stream leaving the contactor through conduit 58. Water-rich glycol or other desiccant leaves the contactor through conduit 60 at the lower portion thereof and by pump 62 is caused to travel to a sump, not shown but as in FIG. 1, through glycol accumulator coil 95 where it passes in heat exchange with lean glycol. From the accumulator, through conduit 66, the glycol enters stripping tower 68 of the glycol reboiler 70. Alternatively, part or all of the rich glycol may be caused to pass through conduit 67 into heat exchange with the vapors leaving stripping column 68 where they are returned through conduit 69 to the accumulator heat exchange. A typical U-tube and burner 72 is provided to boil off a large percentage of the water within the glycol desiccant, said water vapor and other entrained stripping gas leaving the stripping column 68 through conduit 74. Partially reconcentrated glycol then passes to a float operated trap 78 for maintaining the level of glycol within the reboiler. Partially reconcentrated glycol leaves the float trap 78 through conduit 80 into insulated vacuum flash chamber 82 where it flows through packing 84 which provides added surface to enhance the attainment of vapor-liquid equilibrium, thence outward through conduit 86 into the glycol accumulator 64. Some communication is maintained from the top of the accumulator into the vacuum flash chamber by way of conduit 88. A vacuum is maintained within the flash chamber by passing pressure gas, such as dry gas from conduit 58, through the conduit 90. This action through the eductor creates a vacuum through conduit 92 into the top of the flash chamber further aiding in the separation of vapors from the partially reconcentrated glycol. In this embodiment the resultant gases may be recirculated through conduit 94 back into the glycol reboiler as a contacting medium with the glycol therein.

Figure 3:
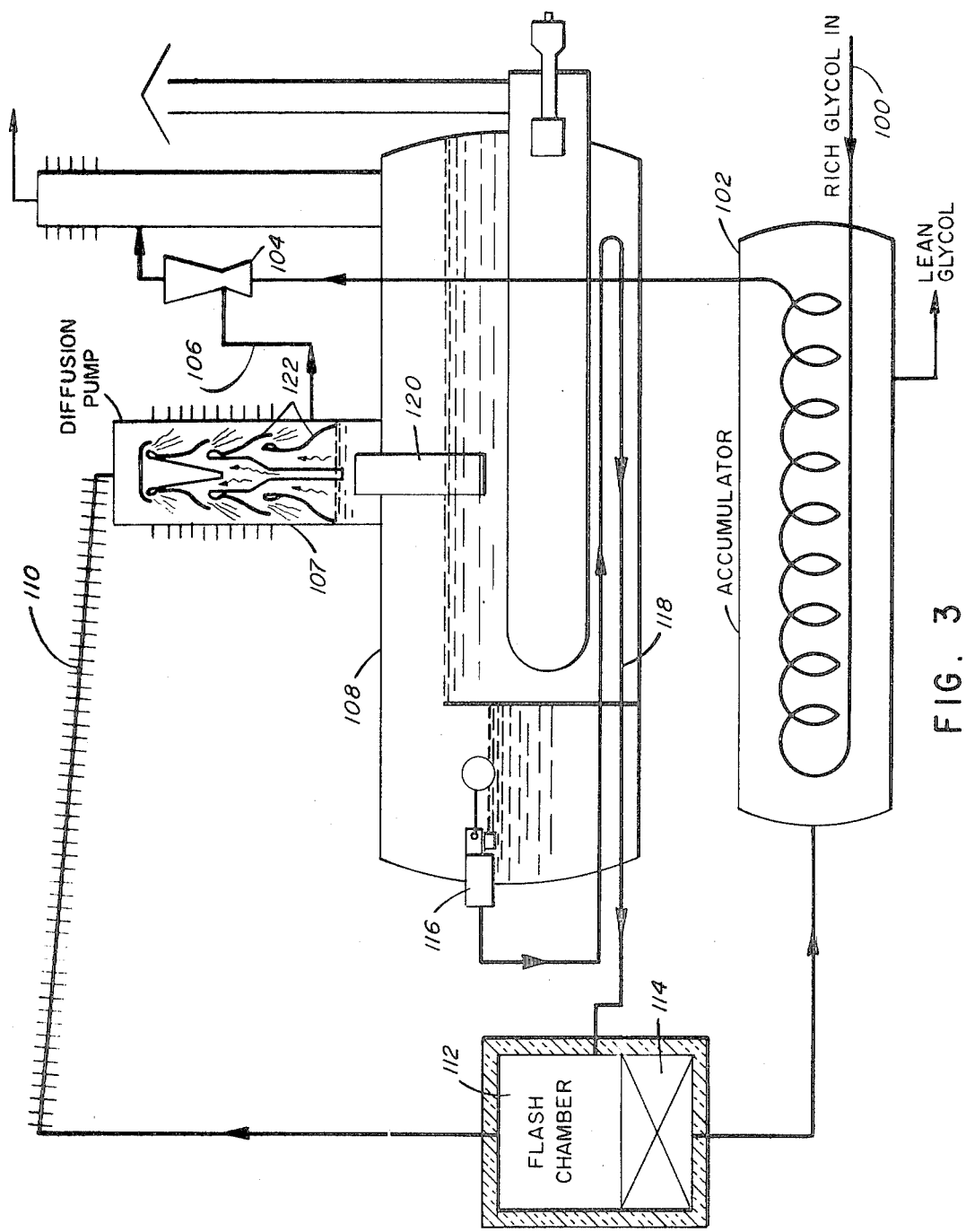
FIG. 3 is an additional embodiment using an eductor, driven by rich glycol from the contactor, in combination with a reboiler heat generated diffusion pump in creating even lower vacuum in the flash chamber separated from the reboiler.

Referring to the embodiment of FIG. 3, rich glycol from the contactor enters conduit 100 into heat exchange with the lean glycol in accumulator 102. The outlet therefrom, under pressure, is caused to pass through an eductor 104, the vacuum intake 106 of which is connected to a diffusion pump system 107 interconnected with the reboiler 108. The diffusion pump in turn is connected through a natural draft heat exchanger 110 with the upper portion of an insulated flash chamber 112 having packing 114 therein.

A float control outlet 116 from the reboiler passes partially reconcentrated glycol or other desiccant into heat exchange with the reboiler glycol through conduit 118 where it is caused to enter the flash chamber 112. The use of a diffuser pump of a type such as manufactured by Central Scientific Company includes a heat pipe 120 which is interconnected with the hot glycol within the reboiler. Vapors passing upwardly are diverted by the baffles 122 through constructions which create additional vacuum. The combination of the eductor 104 and the diffusion pump greatly increases the vacuum capable of being applied to the partially reconcentrated glycol entering the flash chamber 112.

What is claimed:

1. A method of reconcentrating liquid desiccant used in a fluid dehydration contactor comprising:
    partially reconcentrating said desiccant utilizing heat in a reboiler;
    controllably trapping and removing a separate stream of said partially reconcentrated desiccant from said reboiler;
    conveying said stream to a flash chamber via a conduit which is in heat exchange with the desiccant adjacent the source of said heat in said reboiler;
    inducing a vacuum in said flash chamber to further reconcentrate said desiccant stream; and
    removing said further reconcentrated desiccant stream from said flash chamber for use in said dehydration contactor.

2. A method according to claim 1 including creating said vacuum by a fluid-impellent pump.

3. A method according to claim 2 wherein said fluid impellent is said liquid desiccant from said contactor.

4. A method according to claim 3 wherein said impellent is heat exchanged with reconcentrated desiccant.

5. A method according to claim 2 wherein said fluid impellent is relatively dry fluid from said contactor.

6. A method according to claim 5 wherein said fluid is a gas.

7. Apparatus for reconcentrating liquid desiccant used in a fluid dehydration contactor, such as glycol, comprising in combination:
    a reboiler to create partially reconcentrated desiccant;
    a float operated valve to trap and remove a portion of said partially reconcentrated desiccant and to maintain a substantially constant level of desiccant within said reboiler;
    a flash separation chamber separated from said reboiler;
    conduit means to convey said portion of said partially reconcentrated desiccant from the outlet of said float operated valve thence back into said reboiler adjacent the source of heat for heat exchange with the remaining partially reconcentrated desiccant therein, thence to said flash chamber to make a higher reconcentrated desiccant;
    means to induce a vacuum in said flash chamber; and
    means to flow said higher reconcentrated desiccant from said flash chamber to, eventually, said gas dehydration contacting tower.

8. Apparatus of claim 7 wherein said means to induce said vacuum comprises a fluid impellent pump and vacuum conduit means connecting between said pump and said flash chamber.

9. Apparatus of claim 8 wherein said fluid impellent is liquid desiccant from said contactor.

10. Apparatus of claim 9 wherein said fluid impellent is heat exchanged with said higher reconcentrated desiccant prior to use in said pump, and means to cool said vacuum conduit means.

11. Apparatus of claim 10 wherein a diffusion pump, using a heat source from said reboiler, is interposed in said vacuum line between said chamber and said pump.

12. Apparatus according to claim 8 wherein said fluid impellent is relatively dry fluid from said contactor.

13. Apparatus of claim 8 including means to cool said vacuum conduit.

* * * * *